(No Model.)  
W. C. JOHNSON.  
SEEDING MACHINE.  
3 Sheets—Sheet 1.
No. 508,321.  
Patented Nov. 7, 1893.
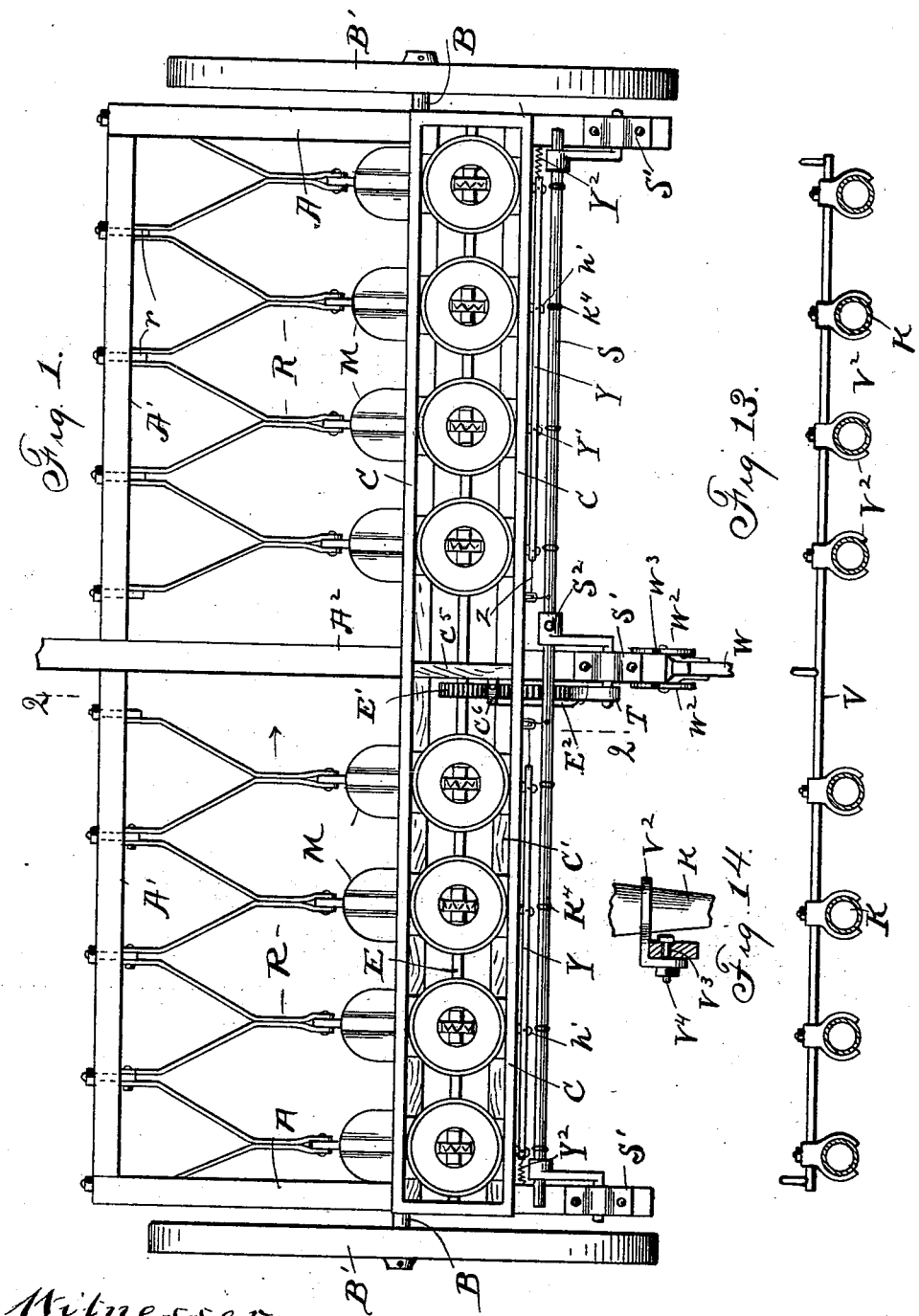

(No Model.)
W. C. JOHNSON.
SEEDING MACHINE.
No. 508,321. Patented Nov. 7, 1893.
3 Sheets—Sheet 2.
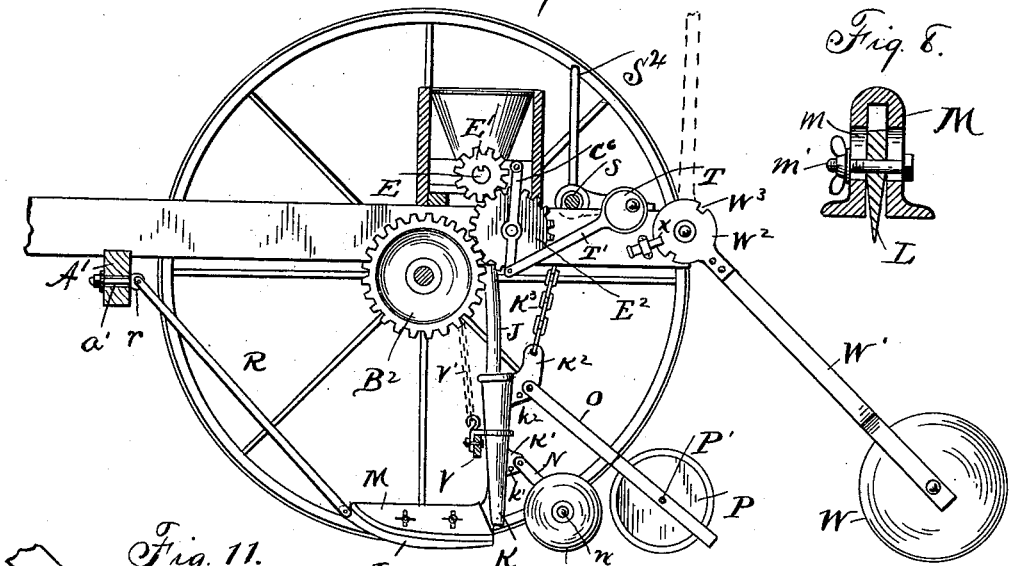
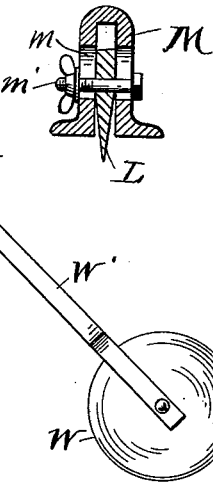
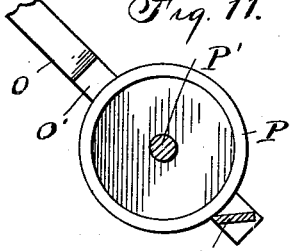
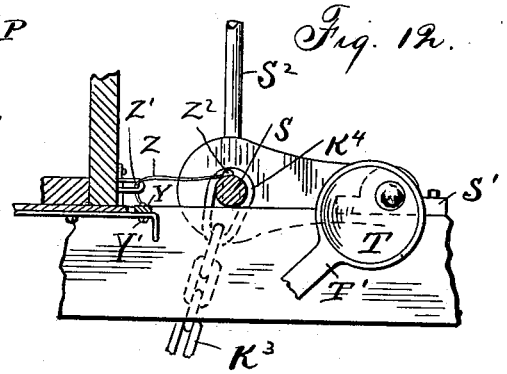
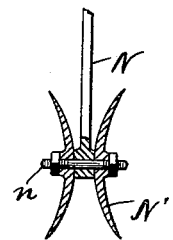
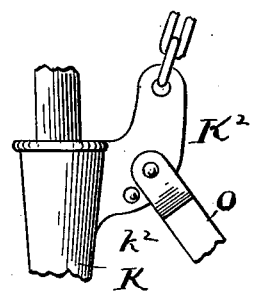
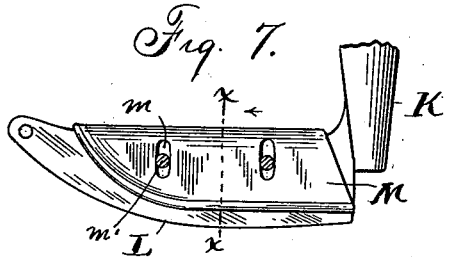
Witnesses
E. B. Gilchrist
Inventor
William C. Johnson (No Model.) 3 Sheets—Sheet 3.

W. C. JOHNSON.
SEEDING MACHINE.

No. 508,321. Patented Nov. 7, 1893.

Witnesses.
E Byron Gilchrist

Inventor
William C. Johnson

UNITED STATES PATENT OFFICE.

WILLIAM C. JOHNSON, OF CRESTON, OHIO.

SEEDING-MACHINE.

SPECIFICATION forming part of Letters Patent No. 508,321, dated November 7, 1893.

Application filed March 4, 1892. Serial No. 423,723. (No model.)

*To all whom it may concern:*

Be it known that I, WILLIAM C. JOHNSON, of Creston, in the county of Wayne and State of Ohio, have invented certain new and useful Improvements in Seeding-Machines; and I do hereby declare the following to be a full, clear, and exact description of the invention, such as will enable others skilled in the art to which it pertains to make and use the same.

My invention relates to improvements in seeding-machines, and more especially to a seed-drill designed for sowing fine seeds, such, for instance, as onion-seed; and it consists in certain features of construction and in combination of parts, hereinafter described and pointed out in the claims.

Figure 3:
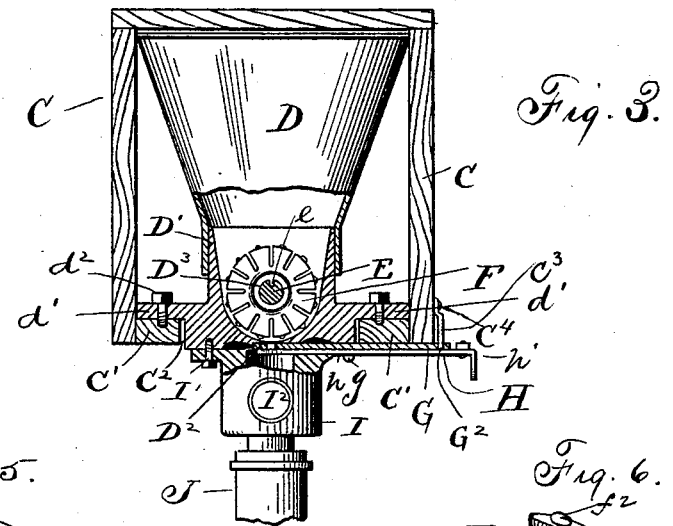
Figure 4:
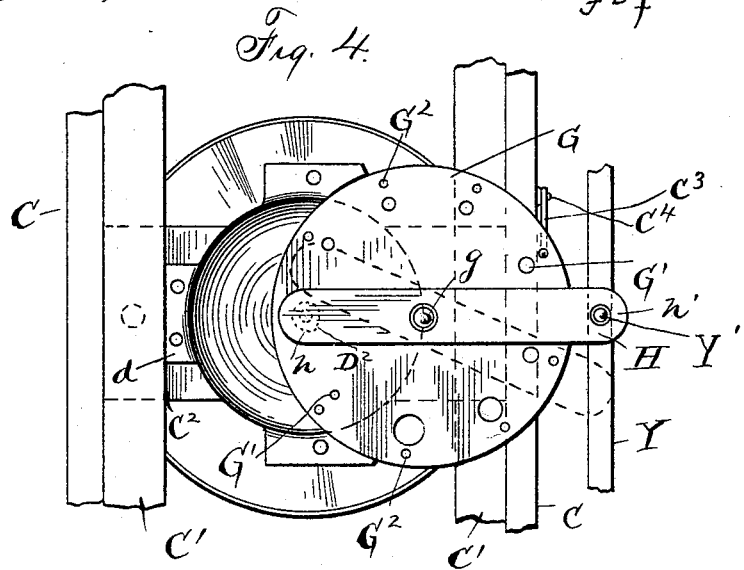

In the accompanying drawings, Figure 1 is a plan view of my improved machine showing the cover of the hopper-box removed. Fig. 2 is a side elevation in section on line 2—2, Fig. 1, looking in the direction of the arrow. Fig. 3 is a side elevation, partly in section, of one of the seed-hoppers and support for the same, and Fig. 4 is a bottom plan of the same somewhat enlarged as compared with Fig. 3, with cup or member I and connected hose or flexible-tube J removed. Figs. 4, 5, 6, 7, 8, 9, 10, 11, 12, 13 and 14 are views in detail.

The frame-work of the machine comprises side-members A, a forward transverse member, A', and a central longitudinal member, $A^2$, the latter also extending forward of member, A', such forwardly-extending portion of member, $A^2$, constituting the tongue of the vehicle. Side-members A, and central member $A^2$, at or near the central portion thereof, are provided with journal-bearings for axle B, upon which are mounted, outside of members A, the main-wheels B' of the vehicle.

Supported by members A $A^2$ of the frame-work, and preferably just rearward of the axle, is the hopper-box C. The bottom C' of box C is slotted or open, as at $C^2$, the slot or opening being preferably centrally located and extending the entire length of bottom C'. This slotted or open portion of the bottom is adapted to receive the lower end $d$ of the feed-cup D' of hoppers D, any number of which hoppers may be provided according to size of the machine, there being preferably an equal number at either side of member $A^2$ of the frame-work, the discharging orifice $D^2$ of feed-cup D' being of sufficient size to permit the escape of the largest seeds the machine is designed to drill or plant, and just above the bottom members of box C, feed-cups D' are provided with lugs or flanges, $d'$, perforated for the reception of screws or bolts, $d^2$, to secure the feed-cups and hoppers in position in box C. By such construction it will be observed that by loosening or removing screws or bolts $d^2$, hoppers D can be moved endwise of box C as desired and adjusted any desired distance apart according as it is desired to deposit the seed in rows more or less apart.

The feed-cups or hoppers D are perforated laterally, as at $D^3$, and on opposite sides, for the passage of shaft E, the latter extending the entire length of box C and having bearing in the end members of said box. Upon shaft E, within each cup D', is mounted a feed-wheel, F, the latter being secured to the shaft so as to rotate therewith, usually by the well known means of groove and feather, as at $e$, the groove extending preferably the entire length of the shaft so as to accommodate the adjustability of the hoppers endwise of box D aforesaid.

Lateral perforations $D^3$ are flanged internally of feed-cups D', as at $d^3$, so as to present a flat surface inwardly, and hubs F' of feed-wheels F fit nicely between the flat surfaces $d^4$ of flanges $d^3$ of the respective feed-cup.

To the bottom of feed-cups D' is pivotally secured a disk, G, as at $g$, that has a series of holes, G', arranged in concentric order with the axis of the disk, and adapted to register, respectively, with the discharge-opening of feed-cup D', holes G' varying in size and more or less holes being provided, according to the different sized seeds the machine is designed to drill or plant. Located immediately below disk G, and pivoted also at $g$, in common with disk G, is a plate or cut-off, H, the inner end $h$ of which is adapted to close the discharge-opening of feed-cup D', and, at the opposite or outer end, cut-off H extends rearward of the hopper-box, as at $h'$, for manipulating the cut-off by hand, or as hereinafter described.

Disk G, outside of holes G', is provided with a series of holes, $G^2$, arranged in concentric order with the axis of disk G, holes G² being each located in the same radial plane with a hole, G', and to the back side of hopper-box C, is pivoted a hook, C³, as at C⁴, that is adapted to engage the respective holes G² and lock disk G in its adjusted position.

Figure 5:
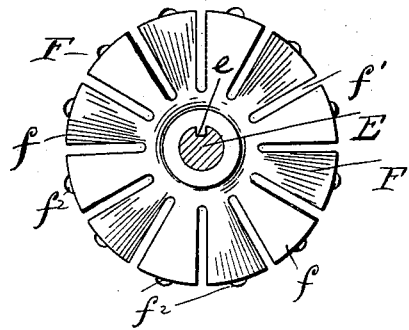
Figure 6:
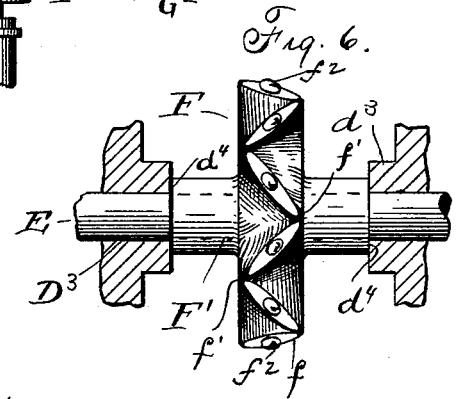

Referring to feed-wheel F, that is more clearly shown in Figs. 5 and 6, it will be observed that the same comprises blades or arms, *f*, arranged radially about the wheel, and at an angle, preferably a right angle to each other, with a space, as at *f'*, between adjacent edges of adjacent arms. By this construction the seed will not only be fed as desired but sufficiently agitated to prevent the seed from bunching or being formed into lumps, and arms *f*, on the periphery, and preferably at the central portion thereof, have a lug or projection, *f²*, lugs or projections *f²* being adapted to hinder and prevent the seed clogging the discharge-opening of the feed-cup of the hopper.

The feed-cup of the hopper discharges, through the respective hole in disk G, into a cup, I, bolted or secured to the bottom of the feed-cup in any suitable manner, as at I', cup I being provided with a window, as at I², for inspecting purposes, and discharging into a hose or flexible tube, J, secured to its lower end.

Hose J is adapted to conduct the grain to a spout, K, that is rigidly secured to, or integral with, the respective share L.

Shares L are, respectively, provided with a shoe, M, adjustable vertically of the share, to enable the share to cut a furrow greater or less in depth as required. A preferable construction is shown more clearly in Figs. 7 and 8, wherein shoe M embraces the upper portion of the share, and is provided with slots, as at *m*, whereby the shoe may be adjusted as aforesaid, bolts or suitable devices, as at *m'*, being provided to hold the shoe in its adjusted position.

Spout K, preferably about midway thereof, has a rearwardly-projecting ear or member, K', that has pivotally secured thereto an arm, N. Arm N, at its opposite or outer end, and extending through and at opposite sides of the same, has a pin, *n*, upon which are loosely mounted a pair of covering-wheels or disks, N', pin *n* being screw-threaded at either end for the reception of a nut to hold wheels N' in place. As shown in Fig. 9, that exhibits a diametrical section of pin *n* and wheels N', it will be observed, that a wheel N' is mounted upon pin *n* at either side of arm N, and that these wheels N' are concave on one side and convex on the opposite side. By the construction just described covering-wheels N' can be readily reversed so as to present inwardly the convex or concave side according as the furrow, made by the share in advance, requires to be covered more or less.

Spout K, at its upper end, has a rearwardly-projecting arm or member, K², to which is pivotally secured the one end of an arm, O.

Arm O, at its opposite or outer end, terminates in a bifurcated portion, as at O', the arms of said bifurcated portion affording bearing for the trunnions P' of a roller P, that is adapted to follow in the path of the covered furrow and compact the ground as required. A scraper, Q, is located between and secured to the members of the bifurcated portion of arm O, the scraping-edge of the same making contact with the periphery of roller P as near the ground as is practicable, thus preventing ground and seed being carried up by the roller. This scraper-mechanism is clearly shown in Fig. 10 that exhibits a perspective, and in Fig. 11 that is an elevation partly in section.

Rearwardly-projecting members K' K² of spout K, are provided each with a pin or stop, as at *k' k²*, for limiting the depression of arms N and O.

Bars, as at R, are provided, as heretofore, for connecting shares L with the transverse member A' of the frame-work of the machine, but I secure members R to member A' of the frame-work by means of eye-bolts, *r*, and slot member A' longitudinally, as at *a'*, whereby eye-bolts *r* and connected shares L and spouts K are adjustable transversely of the machine and more or less apart according to the distance apart it is desired to cut the furrows for receiving the seed from the hoppers above that are correspondingly adjustable as already described.

Spouts K and connected mechanism are connected, by means of a chain or other yielding-device, K³, with a crank-shaft, S, that, has bearing in suitable boxes, S', supported by members A A² of the frame-work aforesaid. Chains K³ are, however, connected with crank-shaft S, by means of hooks, rings or loops, K⁴, see Fig. 12, that are mounted on said shaft, whereby the chains are movable endwise the shaft to accommodate the adjustment of spouts K and connected mechanism.

The following mechanism is provided for communicating motion from axle B' to shaft E upon which feed-wheels F are operatively mounted:—Transversely of hopper-box C and at the central portion thereof, is supported a cross-piece, C⁵, and at one side of this cross-piece shaft E has rigidly mounted thereon a gear-wheel E', and on axle B, below gear E', is mounted a gear-wheel, B². To cross-piece C⁵ is pivoted a depending arm, C⁶, to which is pivotally secured a gear-wheel, E², that, in its normal position, is in mesh with gears E' and B², and hence communicates the desired motion from axle B to shaft E. And the following mechanism is provided for operatively disconnecting gears E' and B² and elevating shares L and attachments from the ground when required, and for accomplishing this simultaneously:—Arm C⁶ extends below the axis of gear E², and to the lower end of this arm is pivoted rod T' of eccentric T that is operatively connected with crank-shaft S. Crank-shaft S is provided with a hand-lever, S², and when the machine is in operation the person in charge, following the machine, by drawing hand-lever S² toward him, can disconnect gears E' and B² and elevate shares L and attachments from the ground as required.

V represents a bar suspended by means of chains V' from members A and A² of the frame-work of the machine, and extending from side to side of the machine. Bar V is provided with straps, clips, or suitable devices V² adapted to embrace or partially embrace spouts K in such a manner as to permit the latter to move freely up and down, but hugging the spouts so closely at the sides as to prevent independent lateral motion of the spouts, and thus maintain parallelism in the furrows made by the shares.

To accommodate the adjustability of seed-spouts K and attachments sidewise of the machine, straps, clips or members V² are adjustable endwise bar V, the latter being longitudinally slotted, as at V³ (see Fig. 14), for the passage of bolts, V⁴, that secure members V² in place.

Suitable means are provided for preventing irregularity in the direction of travel of the machine, as might result from the animal or animals swerving from the exact path, or from the encounter of stones or obstructions. I provide a wheel, as at W, that, as shown, is centrally located at the rear of the machine, this wheel being pivotally connected by means of an arm W', with the central member A² of the frame-work of the machine, the pivoted end of arm W comprising two circular plates, W², embracing the rear end of member A² of the frame-work of the machine, one of plates W² having peripheral notches, W³, that are adapted to be engaged by a pin or bolt, as at X, supported at the side of member A². Wheel W may be swung upward out of the way when desired to the position shown in dotted lines Fig. 2, and locked in such position by means of pin or bolt X, or other suitable device, until again required for use.

The following mechanism is provided for simultaneously actuating cut-offs H to close the discharge opening of the feed-cups of the seed-hoppers, and for accomplishing this with the same manipulation of lever S² that operates the mechanism to elevate shares L and attachments. At the rear end, cut-offs H that are located at the same side of the central portion of the machine, are connected by a rod or bar, Y, the latter being pivotally secured to the respective cut-offs, as at Y', and each rod or bar Y has connected therewith a cord, Z, the latter leading over a sheave or a staple, secured to the back of the hopper-box, as at Z', and being connected, at the opposite end, with shaft S, as at Z². (See Figs. 11 and 12.) By such provision it will be observed that cut-offs H are simultaneously operated as aforesaid. Springs, as at Y², are provided for simultaneously actuating the cut-offs to open the discharge openings of the feed-cups of the seed-hopper upon releasing lever S², springs Y² being secured at one end to the respective rods or bars Y, and at the other end to some rigid support, such, for instance, as side-members A of the frame-work of the machine, as shown in Fig. 1.

Of course, some suitable mechanism should be provided for locking lever S² in position holding spouts K and attachments elevated and cut-offs H performing their function. Any of the devices heretofore used for such purpose may be employed, and such devices and their application being well known and understood, it is not considered necessary to illustrate or describe the same.

What I claim is—

1. In a seeding machine, the combination with a seed box having a central slot in its bottom, and seed cups adjustable in the slot, of feed wheels located in the seed cups, said wheels having diagonal or zig-zag blades the edges of which are in proximity to each other whereby peripheral pockets are formed in the wheels between each two adjacent blades, substantially as set forth.

2. In a seeding machine, a feed wheel comprising a hub, and arms arranged radially therewith, the arms arranged at angles to each other or in a zig-zag and located with their edges in proximity whereby peripheral pockets are formed by them, substantially as set forth.

3. In a seeding machine, a feed wheel comprising hub and arms arranged about the hub radially and in a zig-zag whereby peripheral pockets are formed, and each arm having a projection on its extreme outer end, substantially as set forth.

4. In a seeding machine, a feed wheel comprising a hub and radial arms arranged in a zig-zag, they being close enough together to form pockets and each arm having a projection centrally located at its outer end whereby said projections are substantially in alignment with one another, substantially as set forth.

5. In a seeding-machine, a share for furrowing the ground, said share being provided with an inverted U-shaped shoe said shoe spanning the upper edge of the share and adjustable vertically of the share to regulate the depth of furrow made by the share, substantially as set forth.

6. In a seeding-machine, the combination, with the share for furrowing the ground, of an inverted U-shaped shoe adapted to embrace the upper portion of the share, said shoe having a vertical slot or slots whereby the same may be adjusted up and down the share, and provided with lateral approximately horizontal flanges at its lower edges and bolts or securing-devices for holding the shoe in the desired adjustment, substantially as set forth.

7. In a seeding-machine, the combination, with the seed-hopper-box, axle of the machine, feed-wheel-shaft and a crank-shaft, as at S, the seed-hopper-box being provided with a cross-piece as at $C^5$, of two gear-wheels mounted in the same vertical plane on the axle and feed-wheel-shaft, respectively, a depending arm, $C^6$, pivotally secured to cross-piece $C^5$, a gear-wheel pivotally connected with the lower end of said depending arm, and suitable means comprising an eccentric and rod, connecting said last-mentioned gear with the crank-shaft aforesaid, whereby said last-mentioned gear is adapted to operatively connect or disconnect the two gears first-above mentioned, substantially as and for the purpose set forth.

8. In a seeding-machine, shares, seed-spouts and attachments substantially as indicated, mechanism for raising and lowering said shares, seed-spouts and attachments, seed-hoppers terminating, at their lower ends, in feed-cups, cut-offs adapted to stop the feed, suitable means connecting said cut-offs with the mechanism for raising the seed-spouts and attachments aforesaid to move said cut-offs in the one direction, and a spring or springs connected with the cut-offs and acting in the direction to move said cut-offs in the opposite direction, substantially as set forth.

In testimony whereof I sign this specification, in the presence of two witnesses, this 2d day of January, 1892.

WILLIAM C. JOHNSON.

Witnesses:
C. H. DORER,
WARD HOOVER.